US006967666B1

(12) United States Patent
Koda

(10) Patent No.: US 6,967,666 B1
(45) Date of Patent: Nov. 22, 2005

(54) COMPOSITE PICTURE GENERATING METHOD

(75) Inventor: Eriko Koda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 09/651,098

(22) Filed: Aug. 30, 2000

(30) Foreign Application Priority Data

Jan. 12, 2000 (JP) .............................. 2000-003186

(51) Int. Cl.⁷ .................. G09G 5/00; G06T 13/00; G06T 15/70; G11B 27/00
(52) U.S. Cl. .................. 345/638; 345/629; 345/473; 345/474; 715/720
(58) Field of Search ................ 345/672, 629, 345/474, 630, 632, 475, 723, 473, 720, 619, 345/638, 641; 707/500.1; 715/720, 723

(56) References Cited

U.S. PATENT DOCUMENTS

| | | | | |
|---|---|---|---|---|
| 5,594,850 A | * | 1/1997 | Noyama et al. | 345/632 |
| 5,742,294 A | * | 4/1998 | Watanabe et al. | 345/672 |
| 5,930,446 A | * | 7/1999 | Kanda | 345/723 |
| 5,970,504 A | * | 10/1999 | Abe et al. | 345/475 |
| 6,002,401 A | * | 12/1999 | Baker | 345/723 |
| 6,144,972 A | * | 11/2000 | Abe et al. | 345/475 |
| 6,151,017 A | * | 11/2000 | Suzuoka et al. | 707/500.1 |
| 6,166,744 A | * | 12/2000 | Jaszlics et al. | 345/629 |
| 6,215,505 B1 | * | 4/2001 | Minami et al. | 345/473 |
| 6,236,412 B1 | * | 5/2001 | Ojima | 345/474 |
| 6,373,508 B1 | * | 4/2002 | Moengen | 345/632 |
| 6,400,374 B2 | * | 6/2002 | Lanier | 345/630 |
| 6,570,581 B1 | * | 5/2003 | Smith | 345/632 |
| 6,571,054 B1 | * | 5/2003 | Tonomura et al. | 386/120 |

FOREIGN PATENT DOCUMENTS

JP      07262410      10/1995

* cited by examiner

Primary Examiner—Sumati Lefkowitz
Assistant Examiner—Chante Harrison
(74) Attorney, Agent, or Firm—Mattingly, Stanger, Malur & Brundidge, P.C.

(57) ABSTRACT

A composite picture generating method is provided which superimposes an arbitrary image with a natural motion over a moving picture and allows the user to easily specify the position on the moving picture of the image to be superimposed. A moving picture over which an image is to be superimposed is selected and played on a display. The moving picture is temporarily stopped where the image is to be superimposed over the moving picture. The image is drawn and superimposed over the moving picture. When the image is determined, the playback of the moving picture is resumed as in a slow mode. As the moving picture is played, the locus of motion of the image is specified on the moving picture by using a pointing device or the like. The synthesizing of the image is performed by superimposing the image over the moving picture being played at the positions corresponding to the specified locus.

26 Claims, 15 Drawing Sheets

| POINT | TIME | POSITION | SIZE | DIRECTION | TRANSMITTIVITY |
|---|---|---|---|---|---|
| d1 | 0:00:10:00 | (240,100) | 1 | 0° | 0 |
| d2 | 0:00:11:00 | (235,105) | 1 | 0° | 0 |
| d3 | 0:00:12:00 | (210,110) | 1 | 15° | 0 |
| d4 | 0:00:13:00 | (190,130) | 1 | 0° | 0 |
| d5 | 0:00:14:00 | (235,150) | 1 | 180° | 0 |
| d6 | 0:00:15:00 | (280,200) | 1 | 180° | 0 |
| d7 | 0:00:16:00 | (210,250) | 1 | 15° | 0 |
| d8 | 0:00:17:00 | (195,255) | 1 | 15° | 0 |
| d9 | 0:00:18:00 | (180,255) | 1 | 0° | 0 |

| POINT | TIME | POSITION | | | |
|---|---|---|---|---|---|
| d1 | 0:00:10:00 | (240,100) | | | |
| ⋮ | ⋮ | ⋮ | | | |
| d6 | 0:00:15:00 | (240,100) | | | |
| a1 | 0:00:16:00 | (280,200) | | | |
| a2 | 0:00:17:00 | (240,230) | | | |
| d7 | 0:00:18:00 | (210,250) | | | |
| ⋮ | ⋮ | ⋮ | | | |

| POINT | TIME | POSITION | | | |
|---|---|---|---|---|---|
| d1 | 0:00:10:00 | (240,100) | | | |
| ⋮ | ⋮ | ⋮ | | | |
| d6 | 0:00:15:00 | (240,100) | | | |
| d7 | 0:00:16:00 | (210,250) | | | |
| d9 | 0:00:17:00 | (180,255) | | | |

| x | 0 | | 130 | 170 | 190 | 250 | | 280 | 340 | 350 |
|---|---|---|-----|-----|-----|-----|---|-----|-----|-----|
| y | 180 | | 175 | 165 | 175 | 170 | | 183 | 189 | 185 |

FIG. 15

| POINT | TIME | POSITION |
|---|---|---|
| d1 | 0:00:10:00 | (130,170) |
| d2 | 0:00:11:00 | (170,100) |
| d3 | 0:00:12:00 | (190,100) |
| d4 | 0:00:13:00 | (250,210) |
| d5 | 0:00:14:00 | (280,160) |
| d6 | 0:00:15:00 | (340,170) |
| d7 | 0:00:16:00 | (350,175) |

COMPOSITE PICTURE GENERATING METHOD

BACKGROUND OF THE INVENTION

The present invention relates to a composite picture generating method of superimposing an image over a moving picture by using a computer, and more specifically to an image synthesizing method suited for synthesizing an arbitrary image moving over a moving picture and a recording medium storing an image synthesizing program.

A commonly used method for superimposing an image over a moving picture generally involves specifying positions on one or more frames at which the image is to be introduced. The area in which the image is to be fitted is generally specified by setting its boundary. An example method of automatically setting a boundary to determine an image synthesizing area in a background moving picture is described in JP-A-7-262410. This method extracts a boundary line in a real video footage, specifies with a pointing device a rough area where a user wants an image to be inserted and determines an exact area of image insertion. In the area thus determined a desired image is superimposed. Once the area is determined, the image can be superimposed over that area without needing to specify the image superimposing position for each frame.

SUMMARY OF THE INVENTION

In the conventional technology described above, when an image to be superimposed is an object that moves in a natural and smooth locus (for example, a bird flying in the sky or a goldfish in a bowl), the method that specifies the superimposing position in one or more frames has a drawback that the motion of the object does not look natural. To make the object look natural in its motion requires detailed calculations to interpolate the frames.

With another method that automatically sets a boundary to determine an area (range) in which the image is to be superimposed, locations other than those the user wants to specify as boundaries are often recognized as boundaries. This method requires high precision in the extraction of the boundary and takes time when an apparatus with a low processing power, such as personal computer for consumer, is used.

An object of the present invention is to provide a composite picture generating method that can easily synthesize an image that moves with a natural motion over a background moving picture and to provide a recording medium storing a composite picture generating program.

Another object of the present invention is to provide a composite picture generating method that supports automatically extracting from the background moving picture a movement boundary of an object to be superimposed over the moving picture.

According to one aspect of the invention there is provided a composite picture generating method which comprises the steps of: specifying a locus of motion of the image while replaying the moving picture; and synthesizing the image moving along the specified locus over the moving picture. This allows for image synthesizing wherein the movement of an object superimposed over the moving picture looks natural.

According to another aspect of the invention there is provided a composite picture generating method which comprises the steps of: specifying a boundary area in the moving picture; and modifying the locus of motion of the image to meet the specified boundary area condition. Further, the method includes the steps of: specifying information for identifying the boundary area, or area identification information, along with the boundary area; based on the area identification information, determining an actual boundary area in the moving picture being replayed; and modifying an image superimposing position. This makes the creation of an animation of an object moving in desired locations easier than when the conventional procedure is used that automatically generates a boundary to determine the area of movement of the object.

Other objects, features and advantages of the present invention will become apparent from the detailed description of the embodiments of the invention taken in conjunction with the accompanying drawings.

BRIEF DESCRIPTION OF THE DRAWINGS

FIGS. 8A to 8C are tables showing a data structure of the locus of motion of the image in the first embodiment of the invention.

FIG. 15 is a table showing position data of a locus of motion of the image in the second embodiment.

DETAILED DESCRIPTION OF THE EMBODIMENTS

Now, embodiments of the present invention will be described in detail by referring to the accompanying drawings.

Figure 1:
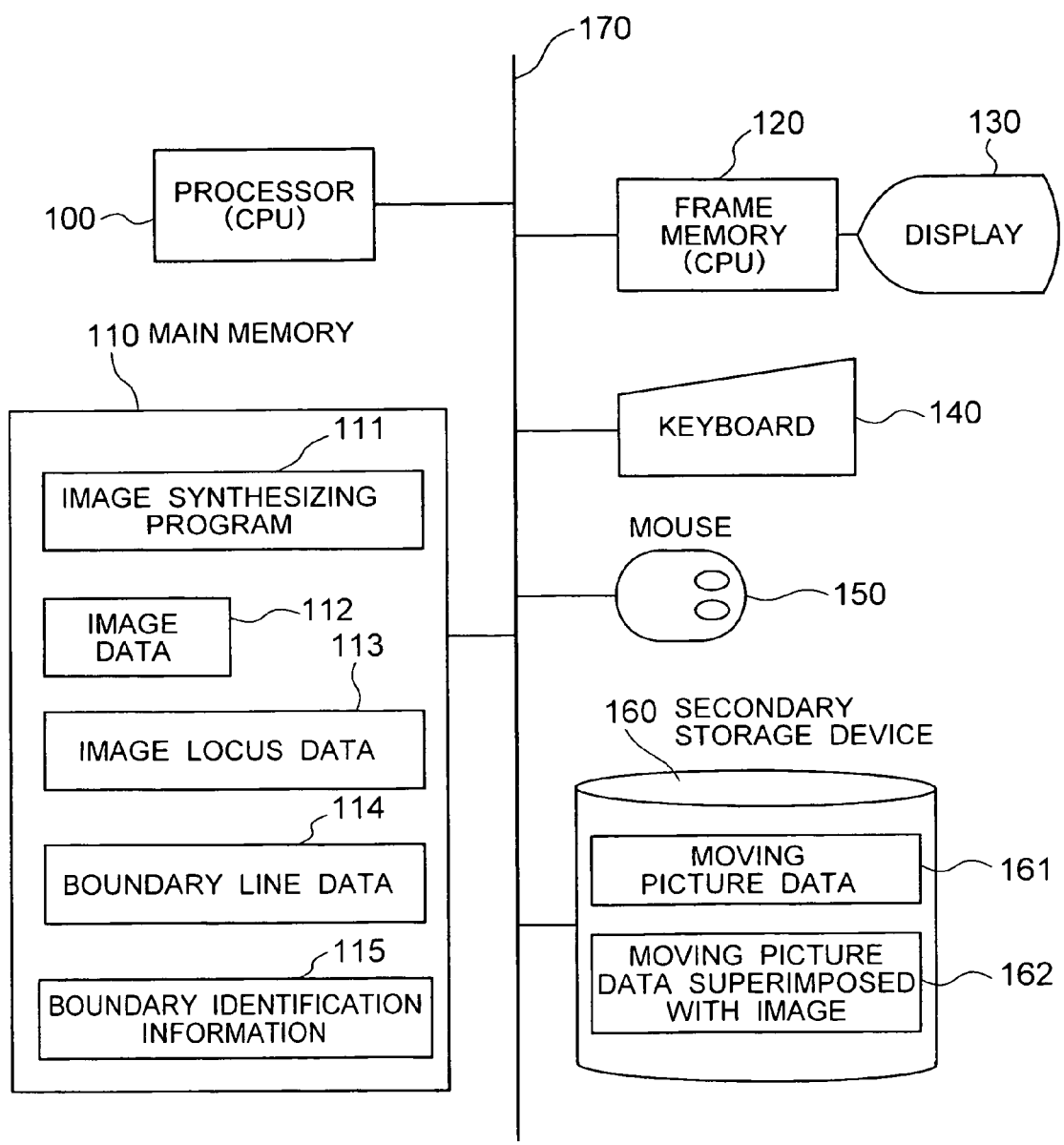
FIG. 1 is a block diagram showing an example configuration of a computer system used in the present invention.

FIG. 1 is an example configuration of a computer system used by the composite picture generating method of the present invention. This system comprises a processor (CPU) 100, a main memory 110, a frame memory 120, a display 130, a key board 140, a pointing device such as a mouse 150, a secondary storage device 160 and a bus 170 to connect them. The main memory 110 is preloaded with a composite picture generating or image synthesizing program 111 and also stores image data 112, image locus data 113, boundary line data 114 and boundary identification information 115, all described later. The secondary storage device 160 stores in advance moving picture data 161 such as real video footage, over which an image is to be superimposed, and moving picture data 162 that was superimposed with an image.

The processor 100 starts the image synthesizing program 111 stored in the main memory 110 to display an image synthesizing program view on the display 130. Then the image synthesizing program 111 operates interactively with the user. First, the moving picture data 161 stored in the secondary storage device 160 is read out and displayed in a preview area 210 (FIG. 2) of the image synthesizing program view on the display 130 through a frame memory 120. While watching the moving picture thus displayed, the user manipulates the keyboard 140 or pointing device 150 to enter image data to be synthesized into the moving picture, and specify the locus of motion of the image over the moving picture while playing the moving picture and, if necessary, a boundary line and boundary identification information (e.g., color information) in the moving picture that restrict the movement of the image. The image data 112 entered by the user is stored in the main memory 110 and the image locus data 113 and the boundary identification information 115 are also stored in the main memory 110 in accordance with the specification of the user. Based on the stored image locus data 113 or, if necessary, on the boundary line data 114 and the boundary identification information 115, the image synthesizing program 111 superimposes the image data 112 over the moving picture data 161 while the moving picture data is played, and displays the synthesized image in the preview area of the image synthesizing program view on the display 130. The moving picture data 162 superimposed with the image is stored in the secondary storage device 160, from which it can be retrieved and used as many times as desired.

Figure 2:
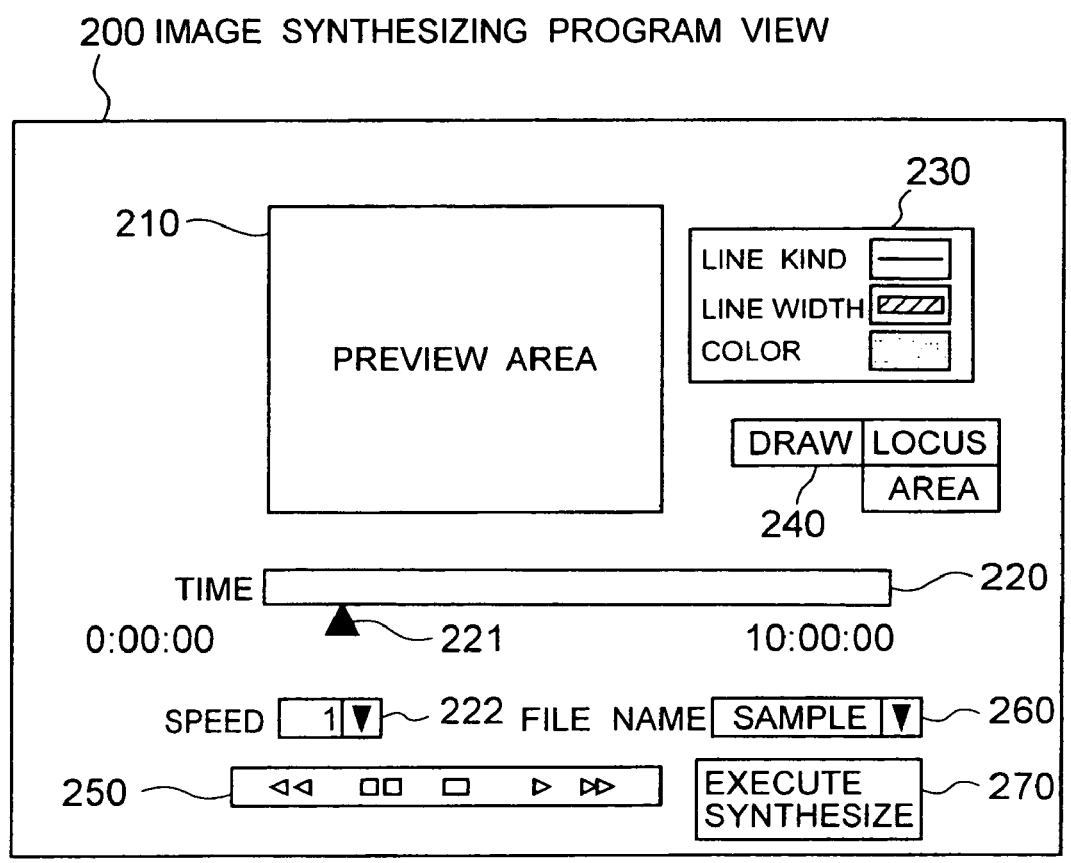
FIG. 2 is an example view of a composite picture generating program used in the embodiment.

FIG. 2 illustrates an image synthesizing program view 200 displayed on the display 130. In FIG. 2, a field 210 is a preview area that plays a moving picture for image synthesizing. The preview area 210 is also used as an area to display the image to be superimposed on the moving picture and a locus of motion of the image. A field 220 is an area indicating the time spent to play the moving picture in the preview area 210. A cursor 221 under the field 220 indicates a currently displayed position in the field 220. A field 222 is an area to specify a playback speed. For example, "1" represents a playback at a normal speed, "½" a playback at half the normal speed (slow playback), and "2" a playback at two times the normal speed. This value can be changed by the keyboard 140 or pointing device 150. A field 230 is an area to specify a kind of line and a color with which to draw an image in the preview area 210. A field 240 is an area (buttons) by which the user can select either drawing of an image, generation/modification of a locus or specification of a superimposing area by using the pointing device 150. A field 250 is to control the moving picture being played in the preview area 210 by using the pointing device 150. Selecting a desired icon can specify the corresponding function, such as moving back to the head position, stopping the playback temporarily, stopping the preview, playing back and moving to the end position. A field 260 is an area to specify a moving picture to be played in the preview area 210 either by directly inputting a file name using the keyboard 140 or by selecting it with the pointing device 150. A field 270 is an area (execute button) to specify the execution of synthesizing by depressing it with the pointing device 150.

First, let us explain about processing, as the first embodiment of the invention, which superimposes an independent image over the moving picture by manually drawing an image and specifying with the pointing device the locus of motion of the image over the moving picture while playing the moving picture.

Figure 3:
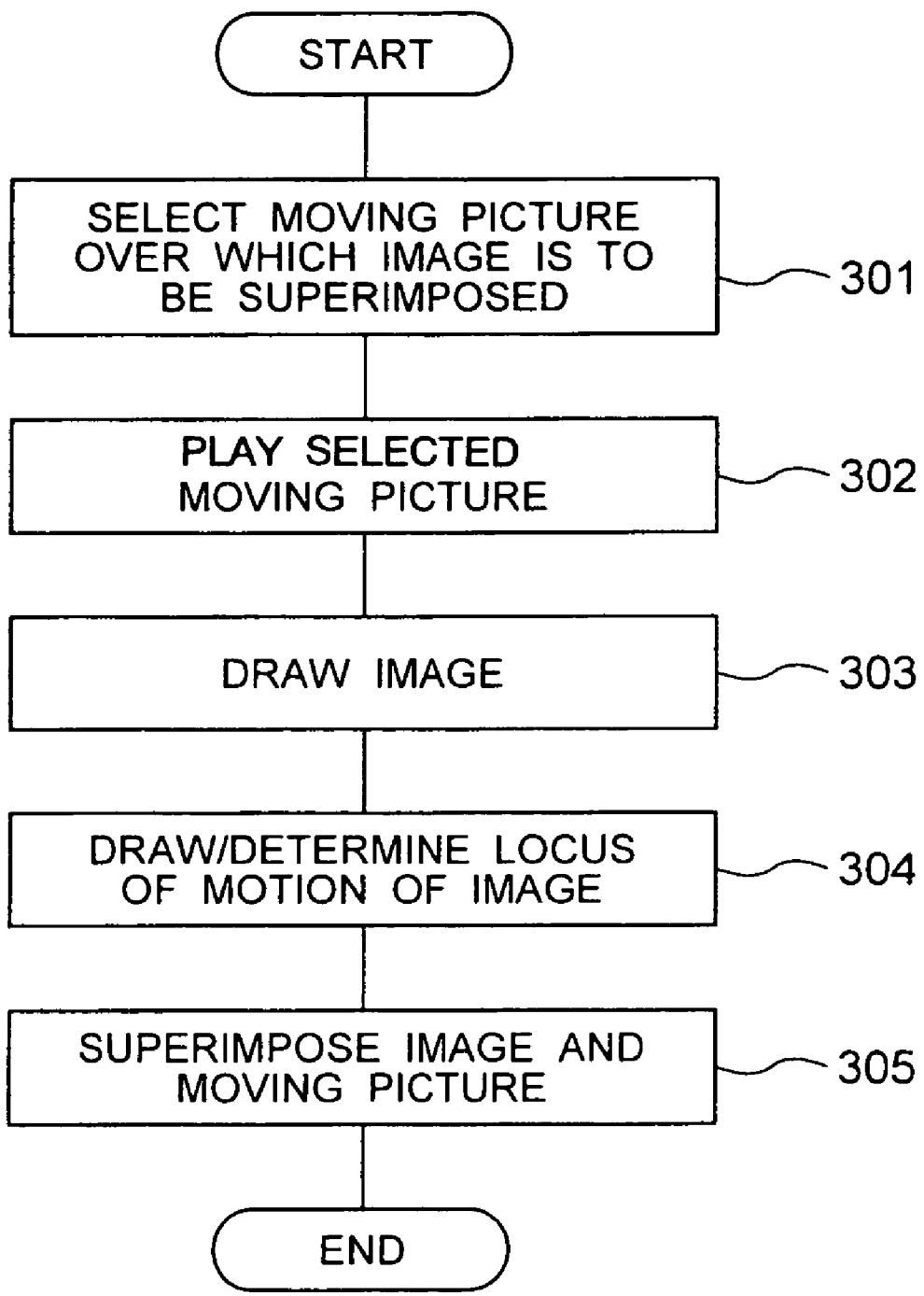
FIG. 3 is a flow chart showing overall processing of a first embodiment of the invention.

FIG. 3 is a flow chart representing an overall processing flow of this embodiment. Here it is assumed that the image synthesizing program 111 has already been started and that the image synthesizing program view 200 is displayed as shown in FIG. 2. Using the pointing device 150 or keyboard 140, the user chooses in the field 260 a file name of a moving picture to be superimposed with an image (step 301). Next, when the user selects a playback start button in the field 250, the corresponding moving picture data 161 is read out from the secondary storage device 160 and displayed on the preview area 210 (step 302). The user depresses a stop button in the area 250 at a desired moving picture playback position to temporarily halt the playback of the moving picture, selects the drawing button in the field 240, selects a kind of line and a color in the field 230, and draws in the preview area 210 an image to be superimposed over the moving picture (step 303) by using the pointing device 150. When the drawn image is determined, the user selects the locus button in the field 240, typically resumes the playing of the moving picture at a low speed, draws and determines the locus of motion of the drawn image in the preview area 210 with the pointing device 150 as the moving picture is played (step 304). The image and the locus of motion of the image drawn in the preview area 210 are stored in the main memory 110 as the image data 112 and as the image locus data 113 representing position data at predetermined intervals. Finally, when the user depresses the synthesize execute button in the field 270, the synthesizing of the image data 112 and the moving picture data 161 is executed based on the image locus data 113 (step 305). The synthesizing operation involves pasting the image data 112 successively to the moving picture frames at corresponding positions based on the time data and position data of the image locus data 113 as the moving picture following the temporary stop is played back.

Figure 4:
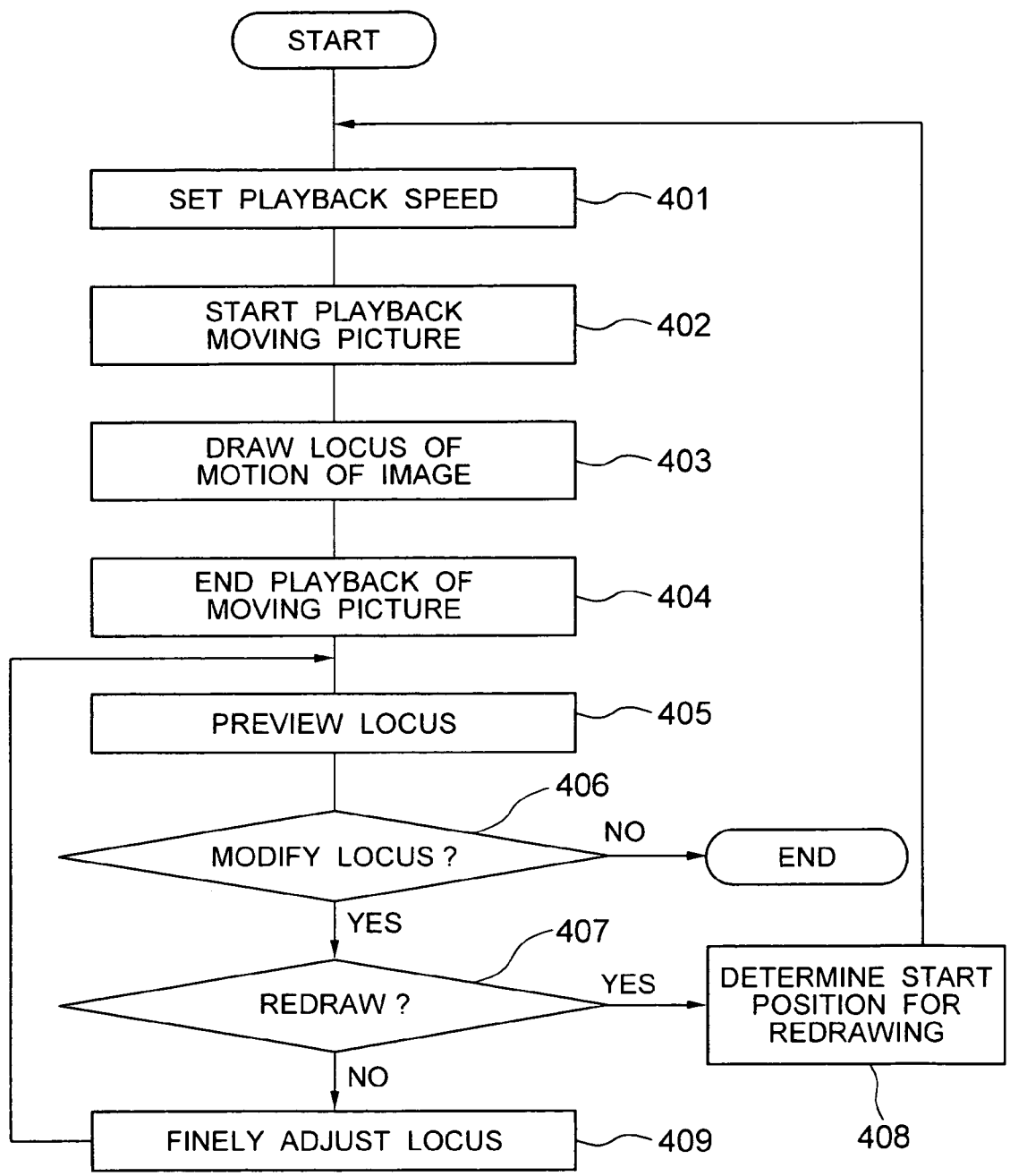
FIG. 4 is a flow chart showing processing for specifying and determining a locus of an image in the first embodiment of the invention.

FIG. 4 is a flow chart showing the detail of the step 304 of FIG. 3. This is explained by referring to an example of FIGS. 5 and 6.

Figure 5:
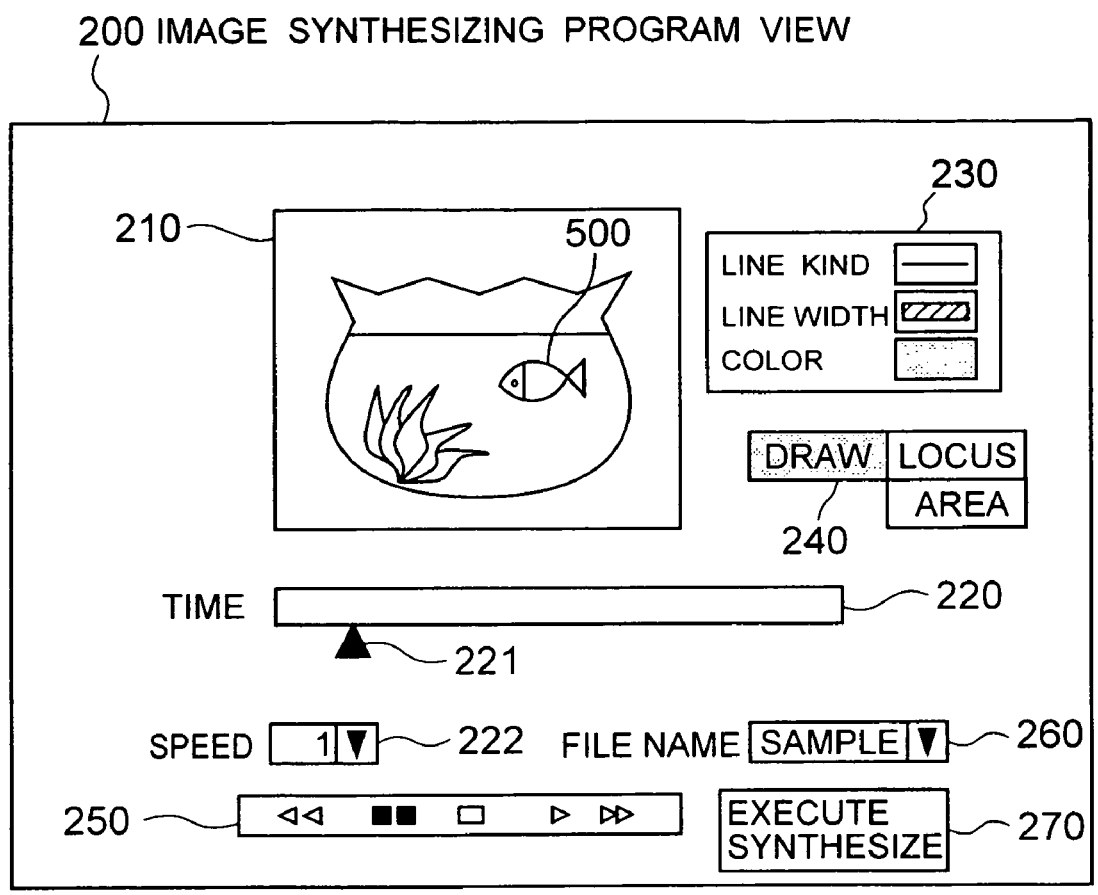
FIG. 5 is an example showing how an image is drawn in the first embodiment of the invention.

FIG. 5 shows an image synthesizing program view 200 with an image drawn by the step 303 of FIG. 3. In the preview area 210, the drawn image (goldfish in this case) 500 is superimposed over the moving picture. The field 240 indicates that the drawing button is selected. The cursor 221 under the field 220 shows the point in time at which the moving picture was stopped. The field 222 indicates that the moving picture was being played at the normal speed.

The user selects the locus button in the field 240 and determines the speed at which to play the moving picture (step 401). In this case, the playback speed is set, for example, at half the normal playback speed (slow playback) to ensure that the locus of motion of the image can be drawn easily as the moving picture is played. Next, the user resumes the playback of the moving picture by operating a particular key on the keyboard 140 (step 402) and at the same time moves the cursor representing the position of the image 500 in the preview area 210 to draw the locus of motion of the image (step 403). At this time, the speed of the position cursor of the image is adjusted by using the pointing device 150 to match the playback speed of the moving picture. When the drawing of the desired locus of motion of the image is finished, the playback of the moving picture is ended by depressing a particular key on the keyboard 140 (step 404).

Figure 6:
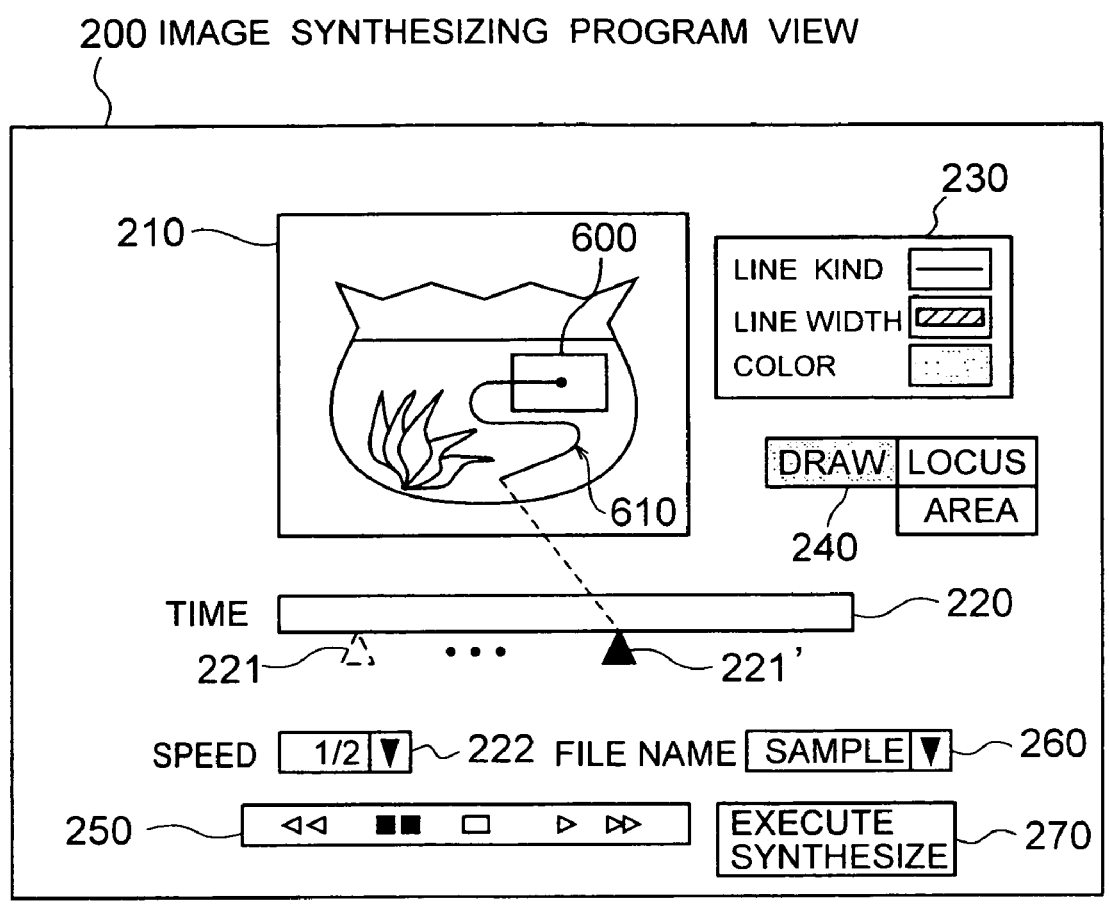
FIG. 6 is an example showing how a locus of motion of the image is drawn in the first embodiment of the invention.

FIG. 6 shows the image synthesizing program view 200 at this time. In FIG. 6, a reference number 600 represents a cursor representing the position of the image and 610 a locus drawn by the step 403. In FIG. 6, the image 500 of FIG. 5 is omitted for the sake of simplicity. The field 240 shows that the locus button is selected. The cursor 221 under the field 220 has moved to a time position 221' (corresponding to the front end of the locus). The playback speed in the field 222 is ½ (slow playback). The locus 610 is sampled and read in at particular time intervals or frame intervals and the position data of a series of locus points and others are stored as the image locus data 113 in the main memory 110. A frame number from which the playback is resumed by the step 402 and a frame number at which the playback is ended by the step 404 are also stored.

After having drawn the motion locus of the image, the user selects the playback button in the function selection field 250 to preview and check the locus 610 (step 405) to decide whether or not to modify the locus 610 (step 406). When the user wishes to modify the locus 610, i.e., the motion of the image, the user moves to step 407. If no modification is made, the processing is ended. If, in the step 407, the user decides to redraw the locus from scratch, the user determines the start position for redrawing (step 408) and returns to step 401. When a fine adjustment is to be made, the drawn locus 610 is directly modified (step 409). The redrawing or direct modification is specified by, for example, clicking on the locus button again in the field 240 or by a right-button click.

Figure 7:
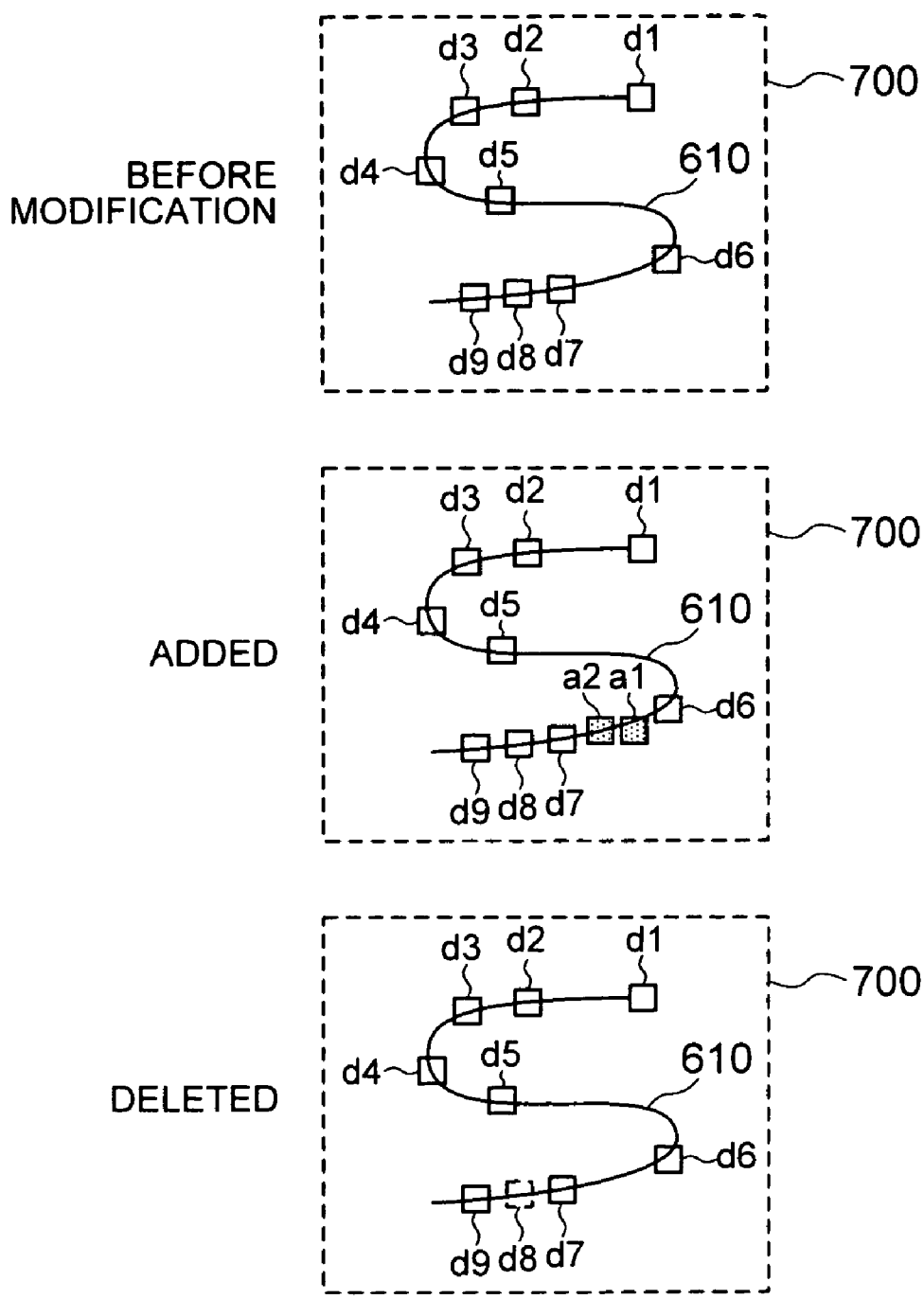
FIG. 7 is an example method of modifying the locus of motion of the image in the first embodiment of the invention.

Next, a method of directly modifying or finely adjusting the locus of motion of the image will be explained by referring to FIGS. 7 and 8. FIG. 7 is an enlarged view of the previewed locus 610. FIG. 8 shows a data structure of the image locus data 113 corresponding to the locus 610.

When the locus of the image is to be finely adjusted, a part of a series of locus points d1–d9 shown in FIG. 7 needs only to be modified (by addition or deletion). In FIG. 7, 700 shows a series of locus points before modification, 710 shows a series of locus points with some points, such as a1 and a2, added, and 720 shows a series of locus points with some points such as d8 deleted. Here, the series of locus points represents the positions picked up at one-second intervals (with the normal playback taken as a reference). It is of course possible to change the point pickup interval to a one-frame interval or 0.5-second interval. A table 800 in FIG. 8A corresponds to the before-modification series of points 700, d1–d9, of FIG. 7. Here, it is possible not only to specify the locus but also to specify or modify the size (magnification factor), direction and transmittivity of the image to be superimposed. When it is desired to slow down the motion of the image, some points, such as a1 and a2, are added where one wants the image to slow down, as indicated by 710 of FIG. 7. As a result, data of a1 and a2 is added as shown in a table 810 of FIG. 8B, changing the locus to the one where the image moves slowly between d6 and d7. Conversely, when it is desired to quicken the motion of the image, a point d8 for instance is removed from where one wants the image to move quickly (although in the figure the point d8 to be deleted is shown dotted, it is actually not displayed). As a result, the data corresponding to the point d8 is deleted as shown in the table 820 of FIG. 8C, shortening the moving time between the points d7 and d9. Although the locus can be modified easily by manipulating the series of previewed points using the pointing device 150, the modification can also be done by reading the image locus data 113 from the main memory 110 and directly changing the corresponding field.

As described above, by moving the pointing device 150 in the preview area of the image synthesizing program view, the locus of an image can be generated and modified easily.

Although this embodiment has described in the case where the playback speed when the locus is entered is constant, it is also possible to speed up or slow down the playback speed of the moving picture by an input device such as keyboard while at the same time drawing the locus with the pointing device. Further, while the flow chart of this embodiment shown in FIG. 3 separates the locus drawing processing from the synthesizing of the moving picture and the superimposed image, it is of course possible to perform these processing simultaneously.

Next, a second embodiment of the present invention will be described which specifies a boundary line and area identification information in a moving picture to automatically modify the locus of the image or to automatically modify the position where the image is superimposed over the moving picture.

Figure 9:
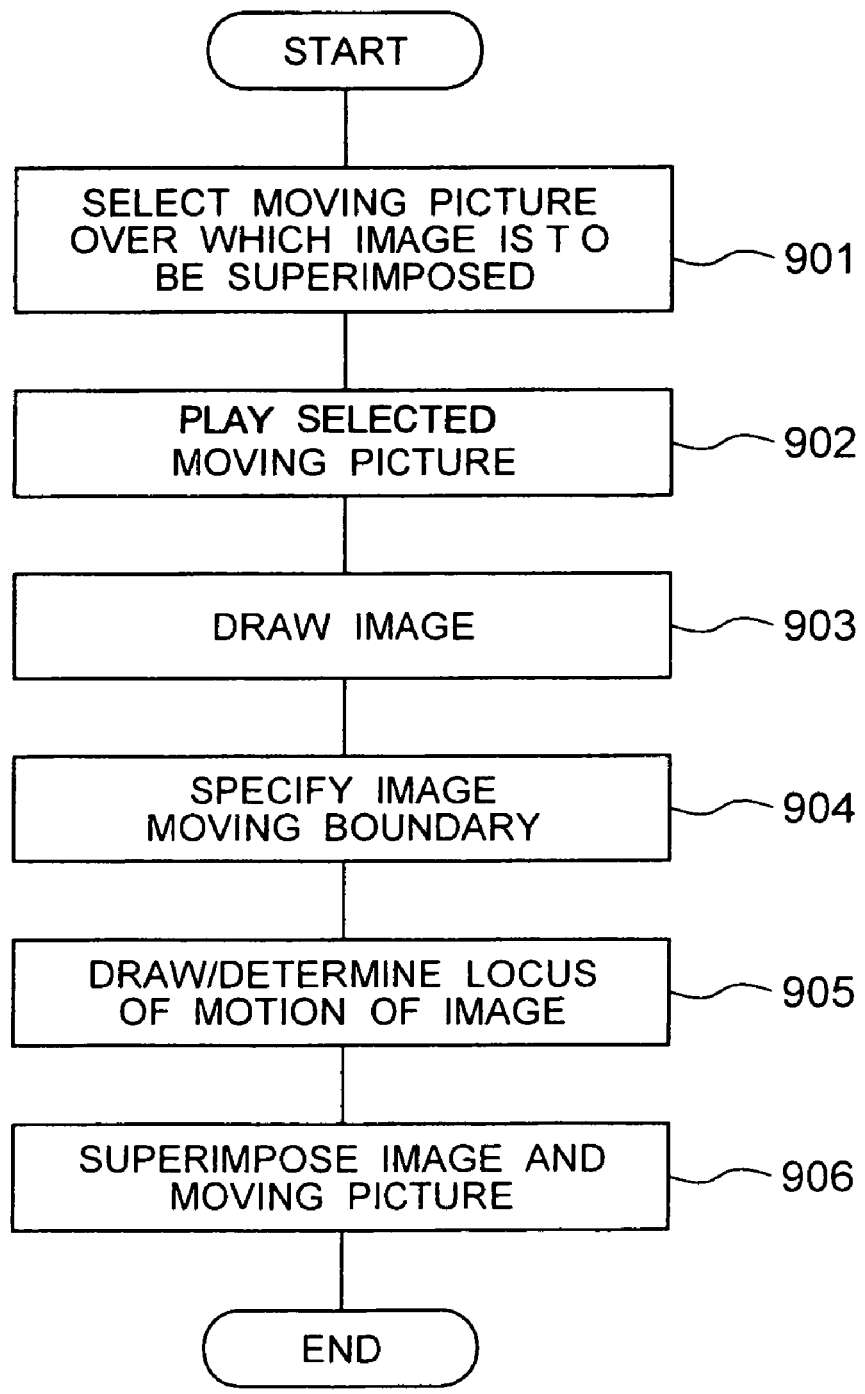
FIG. 9 is a flow chart showing overall processing of a second embodiment of the invention.

FIG. 9 shows in flow chart an overall processing flow of this embodiment. It is assumed that the image synthesizing program 111 has already been started and the display 130 displays the image synthesizing program view 200 as shown in FIG. 2. In FIG. 9, steps 901 to 903 are similar to steps 301 to 303 of FIG. 3 of the first embodiment. When the image to be superimposed over the moving picture has been determined at step 903, the user selects the area button in the field 240 to specify, by using the pointing device 150 on the moving picture in the preview area 210, a boundary line and area identification information of an area in which the image is allowed to move (step 904). Next, the user selects the locus button in the field 240 and resumes the playback of the moving image at a low speed, for example, to draw and determine the locus of motion of the image as the moving picture is played (step 905). This is basically the same as the step 304 of FIG. 3, except that the locus of motion of the image is automatically corrected so that it is within the area specified by the step 904. Finally, when the user depresses the synthesize execute button in the field 270, the image and the moving picture are synthesized (step 906). This, too, is basically the same as the step 305 of FIG. 3 except that the position of the image is automatically corrected according to a change in the boundary line in the playback moving picture.

Figure 10:
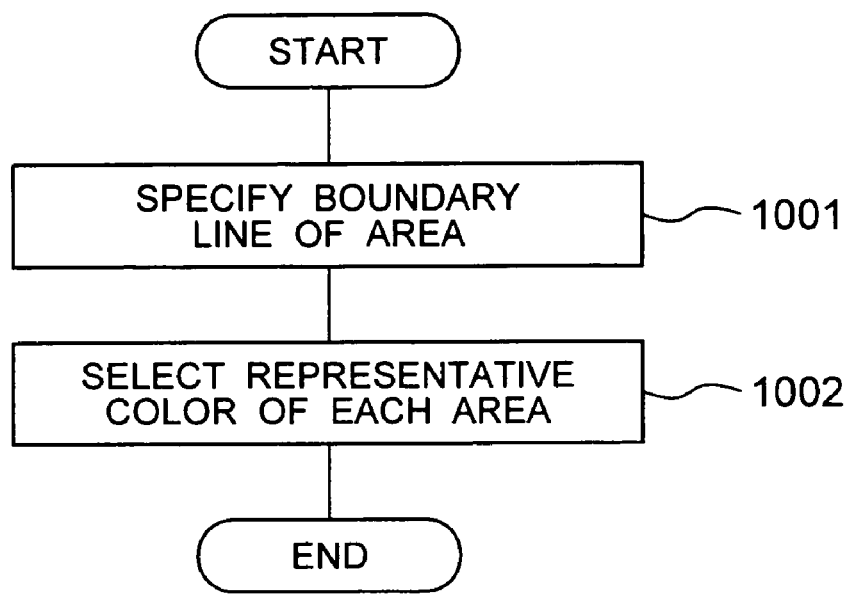
FIG. 10 is a flow chart showing area specification processing in the second embodiment of the invention.
Figure 11:
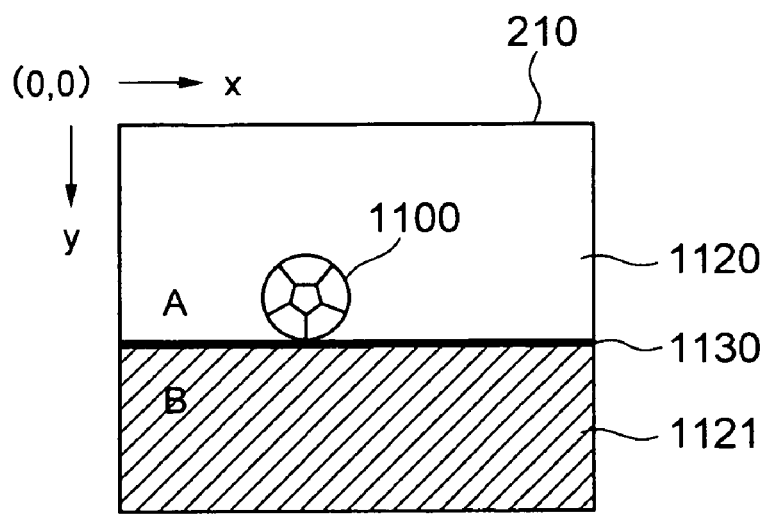
FIG. 11 is an example diagram showing how an area is specified in the second embodiment of the invention.

FIG. 10 is a flow chart showing the detail of the step 904 of FIG. 9. Now let us assume that the displayed state of the preview area 210 of the image synthesizing program view 200 is as shown in FIG. 11. In FIG. 11, reference number 1100 represents an image (ball) drawn by the step 903, 1120 represents an area A or sky, and 1121 represents an area B or ground. The range in which the image 1100 is allowed to move should be limited to the inside of the area A. The user specifies a boundary line 1130 between the two areas with the pointing device 150 (step 1001). Next, by using the keyboard 140 or pointing device 150 the user selects representative colors and other information of the areas A and B divided by the boundary line 1130 as information for identifying the areas A, B (step 1002). The boundary line and the area identification information specified by the steps 1001 and 1002 are stored in the main memory 110. They are indicated by the boundary line data 114 and the boundary identification information 115 in the main memory 110 of FIG. 1.

Figure 12:
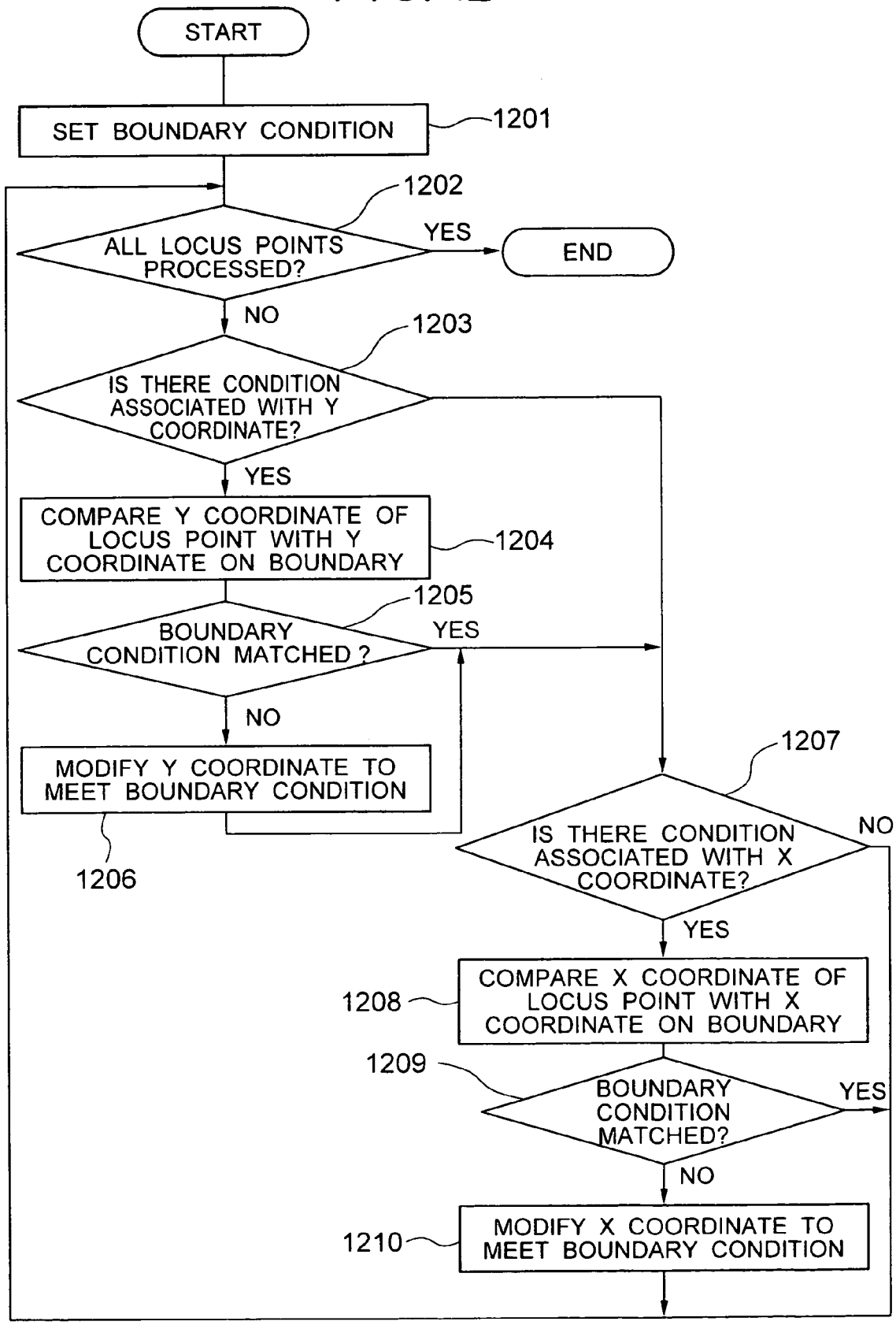
FIG. 12 is a flow chart showing processing that limits the locus of motion of the image to within the area in the second embodiment of the invention.

FIG. 12 is a flow chart of processing that automatically corrects the locus of the image so that it is within the boundary and area specified by the step 904 of FIG. 9. The processing of FIG. 12 may be executed simultaneously in synchronism with the drawing of the locus of motion of the image, or performed on the data of the image locus that has already been drawn.

First, the boundary condition for the movement of the image specified by the step 904 of FIG. 9 is set (step 1201). Then, for each position of a series of locus points, the processing from step 1203 on down is executed. When an (x, y) coordinate is set on the screen, a check is first made to determine whether a boundary condition is set for the Y coordinate (step 1203). If it is not set, the program moves to step 1027. If it is set, comparison is made between the Y coordinate of a position of interest in a series of the locus points and the Y coordinate of the boundary condition (step 1204). Then, it is checked whether the boundary condition is met (step 1205). If the boundary condition is met, the program proceeds to step 1207. If not, the Y coordinate of the position of interest is corrected to meet the boundary condition (step 1206) before moving to step 1207. The step 1207 checks whether a boundary condition is set for the X coordinate. If it is not set, the program returns to step 1202. If the boundary condition for the X coordinate is set, the X coordinate of a position of interest in a series of the locus points is compared with the X coordinate of the boundary condition (step 1208). Then, a checks is made to determine whether the boundary conditions is met (step 1209). If the boundary condition is met, the program returns to step 1202. If not, the X coordinate of the position of interest is corrected to meet the boundary condition (step 1210) before returning to step 1202. The step 1202 checks whether the series of locus points has all been checked. If not, the processing from step 1203 on down is repeated for the next locus point. If all the locus points are processed, the correction processing is ended. While in FIG. 12 the locus points have been described to be processed in the order of Y coordinate and X coordinate for each position in the series of locus points, they can be processed in the reversed order. Alternatively, a Y coordinate group and an X coordinate group for the entire series of locus points may be processed separately.

Next, by referring to FIGS. 13, 14 and 15, an example processing of steps 1204–1206 of FIG. 12 associated with Y coordinate will be described. From the following explanation the processing of the steps 1208–1210 of FIG. 12 associated with X coordinate can easily be understood by analogy.

Figures 13, 14:
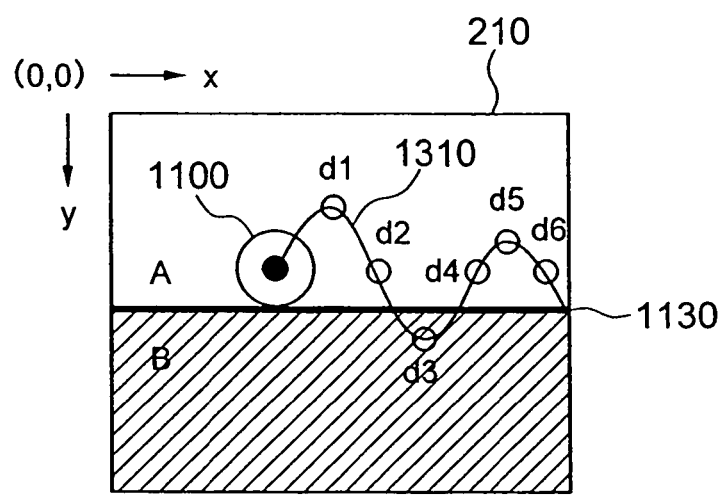
FIG. 13 is an example locus of motion of the image in the second embodiment of the invention.
FIG. 14 is a table showing boundary line data in the second embodiment of the invention.

FIG. 13 shows the locus of motion 1310 of the image 1100 of FIG. 11 drawn on the screen without considering the boundary line 1130. FIG. 14 shows position coordinate data of the boundary line 1130 and FIG. 15 shows position data of a series of points in the locus 1310 spaced at one-second intervals. The data shown in FIGS. 14 and 15 stored in the main memory 110 are actually more detailed data, but only representative positions are shown for the sake of simplicity.

For the series of points on the locus 1310, their Y coordinates plus the radius of the image (ball) 1100 must be higher (smaller) than the boundary line 1130. As shown in FIGS. 14 and 15, the Y coordinate of point d3 is lower (larger) than the Y coordinate of the boundary line 1130. This does not meet the condition that the image (ball) 1100 must move without crossing the boundary line 1130 (i.e., the image must move as if it is on the boundary line). So, the Y coordinate of point d3 is modified so that the lower part of the image 1100 is on the boundary line 1130. This synthesizes the image 1100 so that it appears to move on the boundary line 1130 near the point d3.

Figure 16:
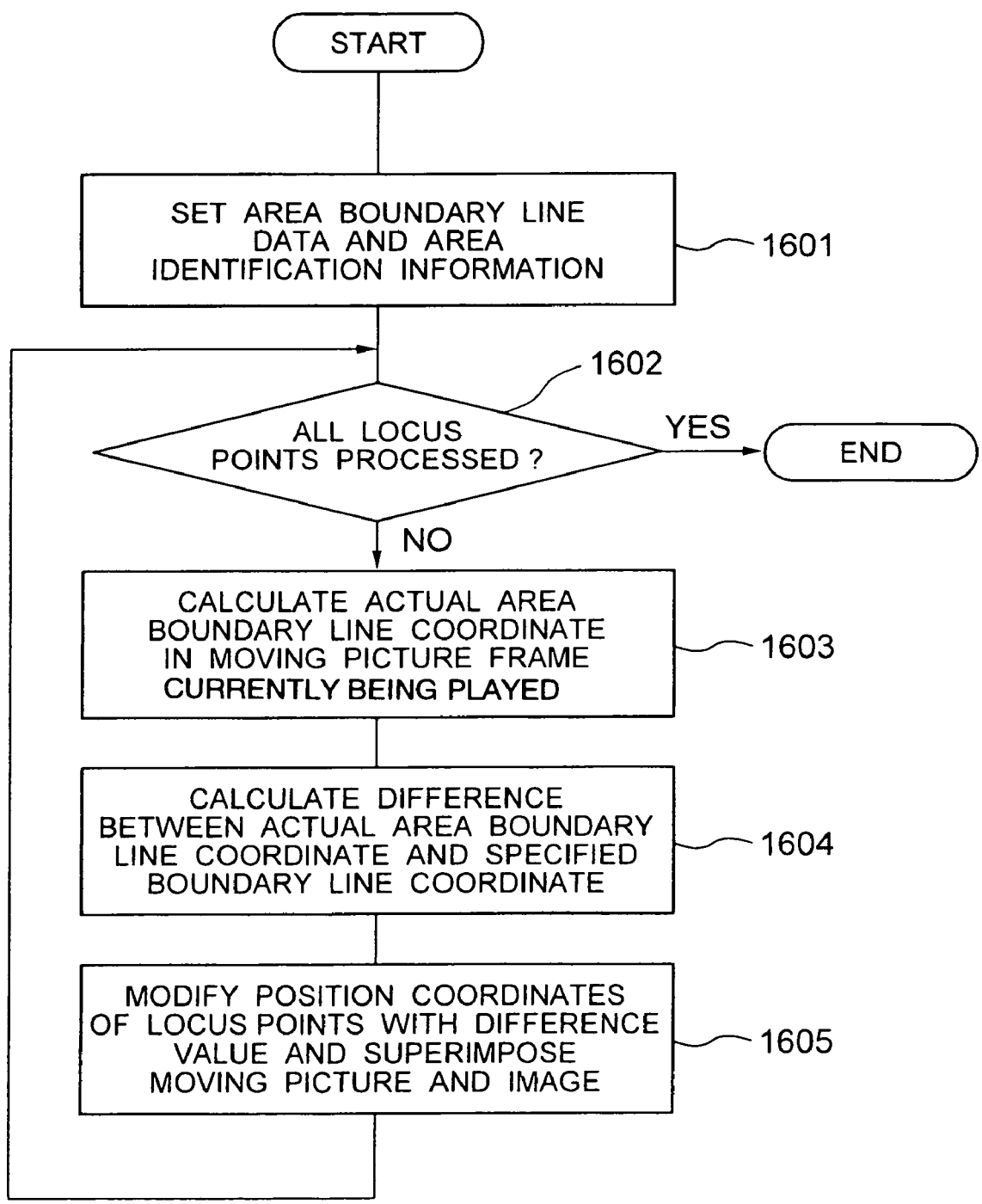
FIG. 16 is a flow chart showing processing that modifies a locus of motion of the image by an actual area boundary line in a moving picture being played in the second embodiment of the invention.

FIG. 16 shows a flow chart of processing which, in the step 906 of FIG. 9 for synthesizing the moving picture and the image, automatically modifies the position data of the locus points of the image when the boundary area in the moving picture being played changes.

First, the area boundary line coordinate data and area identification information such as typical colors of areas, specified by the step 904 of FIG. 9, are set (step 1601). Then, the position data of the series of locus points of the image (image locus data) is retrieved as the moving picture is played and, for each locus point, the processing from step 1603 on down is executed. First, based on the area identification information, the actual area boundary line coordinate at the present time in the frame of the moving picture being played is determined (step 1603). A difference between the actual area boundary line coordinate and the boundary line coordinate set by the step 1601 is calculated (step 1604). The difference value may be obtained by determining a reference position for the real and specified boundary lines in advance and calculating their difference at the reference position, or by determining the differences between the boundary lines at individual positions and calculating their average. This difference value is added to the coordinate value of the position data for the locus point of interest to modify the position coordinate of the image and synthesize the moving picture and the image (step 1605) before returning to step 1602. In step 1602, it is checked whether the series of the locus points has all been processed. If all the locus points are not processed, the steps 1603–1605 are executed for each of the remaining locus points in each frame of the moving picture being played. When all the points are processed, the image synthesizing processing is ended.

Figure 17A:
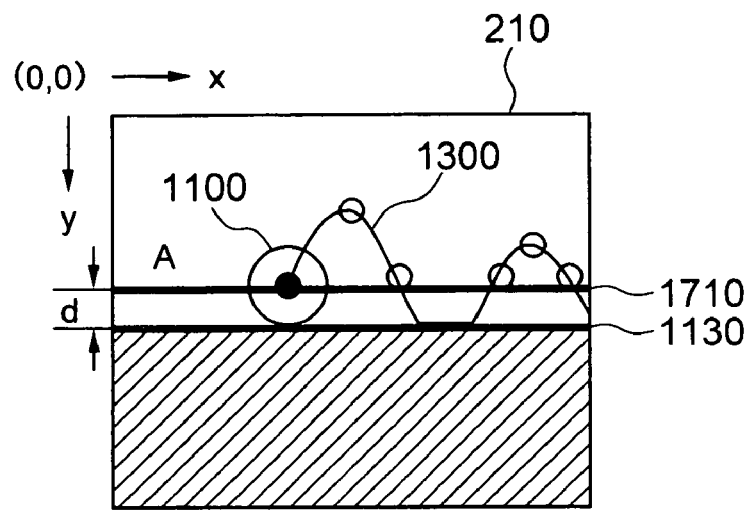
FIGS. 17A and 17B are an example showing how a locus of motion of the image is modified by an actual area boundary line in a moving picture being played in the second embodiment of the invention.
Figure 17B:
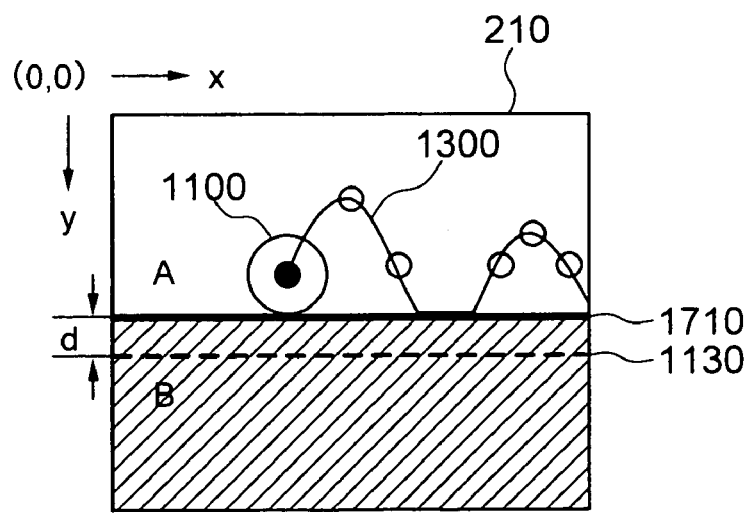

Next, by referring to FIGS. 17A and 17B, an example processing of step 1605 of FIG. 16 will be explained. FIG. 17A represents a state before modification and FIG. 17B represents a state after modification. Reference number 1130 represents an area boundary line specified by the step 904 of FIGS. 9 and 1710 represents an actual area boundary line in the currently replayed moving picture that is determined by the step 1603 of FIG. 16. The value d is the difference between these two boundary lines. The coordinate positions of the image 1100 as shown in FIG. 17A appears unnatural. Thus, in step 1605 of FIG. 16, the position coordinates of the series of locus points are moved upward by the difference value d to obtain a natural synthesized image as shown in FIG. 17B.

In the above embodiments, we have described example cases where a handwritten image is moved over the moving image. The image to be superimposed can be not just a handwritten still image but a prepared animation or moving picture. When specifying the locus of an image, it is possible to specify or modify not only the position but also the size, direction and transmittivity of the image to be superimposed.

In the embodiments the user draws the locus of motion of the image. When an object is moved over the moving picture at a constant speed or at a constant acceleration for example, specifying the initial position, direction and speed (unit movement) of the moving object can automatically determines the locus of motion of the object as the moving picture is played. In this case, the user does not need to draw the locus. Of course, in this case too, it is possible to make a modification similar to that described in the preceding embodiments by specifying the boundary area in which the object is allowed to move and the boundary identification information.

The image synthesizing program for implementing the image synthesizing method of this embodiment can be described in a computer-implemented language and stored in computer-readable recording media, such as floppy disk, CD-ROM and memory card, for transfer.

As described above, this invention allows an arbitrary image with a natural motion to be superimposed over a moving picture without requiring complex computations, making it easy to create an animation in which the image can be made to move in a desired location as by using a pointing device.

What is claimed is:

1. A method of synthesizing an image with a moving picture using a system including an input device, a memory storing the moving picture and a display displaying said moving picture, comprising:
   when replay of said moving picture is stopped at an arbitrary replay positon of said moving picture on said display, identifying an image inputted by said input device and position data of said input image and displaying on said display said input image in superposition with the stopped moving picture;
   storing information of said replay position of said moving picture;
   while replaying said moving picture from said arbitrary replay position, drawing a locus of motion of said image using said input device to determine position data of said locus of motion on the mage with time and storing said determined position data and time data representing when said position data is determined; and
   while replaying said moving picture starting from said stored replay position, displaying on said display said image in accordance with said stored position data of the locus of motion and said stored time data,
   wherein the image is a still image.

2. The method according to claim 1, further comprising adding or deleting said stored position data and said time data representing when said position data is determined in accordance with a designation by said input device.

3. The method according to claim 1, further comprising replaying said moving picture from an arbitrary replay position in accordance with a replay speed designated by said input device.

4. The method according to claim 1, further comprising displaying said moving picture as a background and displaying said image as a foreground.

5. A method of synthesizing an image with a moving picture in a system including an input device, a memory storing a moving picture and a display displaying said moving picture, comprising:
   when replay of said moving picture is stopped at an arbitrary replay position of said moving picture on said display, identifying an image inputted by said input device and position data of said input image and displaying said input image on said display;
   storing information of said replay position of said moving picture;
   identifying information of a boundary line of an area in which the image inputted by said input device can move and displaying said boundary line on said display;
   sotring said information of the boundary line of an area in which said image can move;
   while replaying said moving picture from said arbitrary replay position, drawing a locus of motion of said image using said input device to determine position data of said locus of motion with time based on said stored boundary line information and storing said position data and time data representing when said position data is determined; and
   in response to replaying of said moving picture starting from said arbitrary replay position, displaying on said display said image in accordance with said stored position data of the locus of motion and said stored time data,
   wherein the image is a still image.

6. The method according to claim 5, further comprising modifying the position data of said locus of motion in accordance with said boundary line information and storing time data representing when said modified position and said position data are identified.

7. The method according to claim 5, further comprising adding or deleting said stored position data and said time data representing when said position data is written in accordance with designation by said input device.

8. The method according to claim 5, further comprising replaying said moving picture from an arbitrary replay position in accordance with a replay speed designated by said input device.

9. The method according to claim 5, further comprising displaying said moving picture as a background and displaying said image as a foreground.

10. An apparatus comprising a storage medium with instructions stored therein for synthesizing an image with a moving picture using a system including an input device, a memory storing the moving picture and a display displaying said moving picture, the instructions when executed causing a computing device to perform:
   when replay of said moving picture is stopped at an arbitrary replay position of said moving picture on said display, identifying an image inputted by said input device and position data of said input image and displaying on said display said input image in superposition with the stopped moving picture;
   storing information of said replay position of said moving picture;
   while replaying said moving picture from said arbitrary replay position, drawing a locus of motion of said image using said input device to determine position data of said locus of motion of the image with time and storing said determined position data and time data representing when said position data is determined; and
   while replaying said moving picture starting from said stored replay position, displaying on said display said image in accordance with said stored position data of the locus of motion and said stored time data,
   wherein the image is a still image.

11. The apparatus according to claim 10, further comprising adding or deleting said stored position data and said time data representing when said position data is determined in accordance with a designation by said input device.

12. The apparatus according to claim 10, further comprising replaying said moving picture from an arbitrary replay position in accordance with a replay speed designated by said input device.

13. The apparatus according to claim 10, further comprising displaying said moving picture as a background and displaying said image as a foreground.

14. An apparatus comprising a storage medium with instructions stored therein for synthesizing an image with a moving picture in a system including an input device, a memory storing a moving picture and a display displaying said moving picture, the instructions when executed causing a computing device to perform:

when replay of said moving picture is stopped at an arbitrary replay position of said moving picture on said display, identifying an image inputted by said input device and position data of said input image and displaying said input image on said display;

storing information of said replay position of said moving picture;

identifying information of a boundary line of an area in which the image inputted by said input device can move and displaying said boundary line on said display;

storing said information of the boundary line of an area in which said image can move;

while replaying said moving picture from said arbitrary replay position, drawing a locus of motion of said image using said input device to determine position data of said locus of motion with time based on said stored boundary line information and storing said position data and time data representing when said position is determined; and in response to replaying of said moving picture starting from said arbitrary replay position, displaying on said display said image in accordance with said stored position data of the locus of motion and said stored time data, wherein the image is a still image.

15. The apparatus according to claim 14, further comprising modifying the position data of said locus of motion in accordance with said boundary line information and storing time data representing when said modified position data and said position data are identified.

16. The apparatus according to claim 14, further comprising adding or deleting said stored position data and said time data representing when said position data is written in accordance with designation by said input device.

17. The apparatus according to claim 14, further comprising replaying said moving picture from an arbitrary replay position in accordance with a replay speed designated by said input device.

18. The apparatus according to claim 14, further comprising displaying said moving picture as a background and displaying said image as a foreground.

19. The method according to claim 1, wherein said drawing a locus of motion comprises drawing a locus of motion of said image by said input device on the moving picture under replay on the display.

20. The method according to claim 19, further comprising manually drawing the locus of motion.

21. The method according to claim 5, wherein said drawing a locus of motion comprises drawing a locus of motion of said image by said input device on the moving picture under replay on the display.

22. The method according to claim 21, further comprising manually drawing the locus of motion.

23. The apparatus according to claim 10, wherein said drawing a locus of motion comprises drawing a locus of motion of said image by said input device on the moving picture under replay on the display.

24. The apparatus according to claim 23, wherein the locus of motion is manually drawn.

25. The apparatus according to claim 14, wherein said drawing a locus of motion comprises drawing a locus of motion of said image by said input device on the moving picture under replay on the display.

26. The apparatus according to claim 25, wherein the locus of motion is manually drawn.

* * * * *